United States Patent
Reimers et al.

(10) Patent No.: US 10,090,729 B2
(45) Date of Patent: Oct. 2, 2018

(54) MACHINE WITH A DRIVE TRAIN

(71) Applicant: Siemens Aktiengesellschaft, München (DE)

(72) Inventors: Jan-Dirk Reimers, Aachen (DE); Joachim Rohde, Aachen (DE)

(73) Assignee: Siemens Aktiengesellschaft, München (DE)

( * ) Notice: Subject to any disclaimer, the term of this patent is extended or adjusted under 35 U.S.C. 154(b) by 281 days.

(21) Appl. No.: 14/627,910

(22) Filed: Feb. 20, 2015

(65) Prior Publication Data

US 2015/0244168 A1 Aug. 27, 2015

(30) Foreign Application Priority Data

Feb. 21, 2014 (EP) ..................... 14156112

(51) Int. Cl.
| | |
|---|---|
| *H02K 7/00* | (2006.01) |
| *H02K 5/08* | (2006.01) |
| *F16H 57/02* | (2012.01) |
| *H02H 5/12* | (2006.01) |
| *H02K 11/40* | (2016.01) |

(52) U.S. Cl.
CPC ............... *H02K 7/006* (2013.01); *H02K 5/08* (2013.01); *F16H 2057/02034* (2013.01); *H02H 5/12* (2013.01); *H02K 11/40* (2016.01)

(58) Field of Classification Search
CPC ........... H02K 7/006; H02K 5/08; H02K 11/40
USPC ......................... 307/326, 327, 328
See application file for complete search history.

(56) References Cited

U.S. PATENT DOCUMENTS

| | | | |
|---|---|---|---|
| 2,896,732 A | 7/1959 | Rist | |
| 7,122,986 B1* | 10/2006 | Willard | H01H 33/36 318/468 |
| 8,591,368 B2* | 11/2013 | Dinter | F16H 1/46 290/55 |
| 2006/0152907 A1 | 7/2006 | Rathmann | |
| 2010/0013227 A1* | 1/2010 | Weitkamp | F03D 7/0264 290/44 |
| 2013/0095972 A1 | 4/2013 | Dinter | |
| 2013/0133454 A1 | 5/2013 | Reimers | |
| 2013/0162066 A1* | 6/2013 | Stamm | H02K 21/38 310/46 |

(Continued)

FOREIGN PATENT DOCUMENTS

| | | |
|---|---|---|
| CN | 102577041 | 7/2012 |
| DE | 102010002494 A1 | 9/2011 |
| WO | WO 2013127535 A2 | 9/2013 |

OTHER PUBLICATIONS

Klein-Hitpass, U.S. Pat. No. 8,621,940, Jan. 2014, 2012/0067138, Mar. 22, 2012.

(Continued)

*Primary Examiner* — John Poos
(74) *Attorney, Agent, or Firm* — Henry M. Feiereisen LLC

(57) ABSTRACT

A machine includes a drive train having a drive unit, an output unit, and a gear unit interconnecting the drive unit and the output unit and configured to be in a non-grounded state with respect to the machine environment during a normal operation of the machine. An insulation is provided to electrically insulate a connection between the gear unit and the drive unit and/or a connection between the gear unit and the output unit.

5 Claims, 1 Drawing Sheet

(56) References Cited

U.S. PATENT DOCUMENTS

2013/0180319 A1    7/2013   Klein-Hitpass

OTHER PUBLICATIONS

Ralf Dinter, U.S. Pat. No. 8,632,437, Jan. 21, 2014, 2013/0088016, Apr. 11, 2013.
Ralf Dinter, U.S. Pat. No. 8,784,252, Jul. 22, 2014, 2013/0172141, Jul. 4, 2013.
Ralf Dinter, U.S. Pat. No. 8,591,368, Nov. 26, 2013, 2013/0165288, Jun. 27, 2013.

* cited by examiner

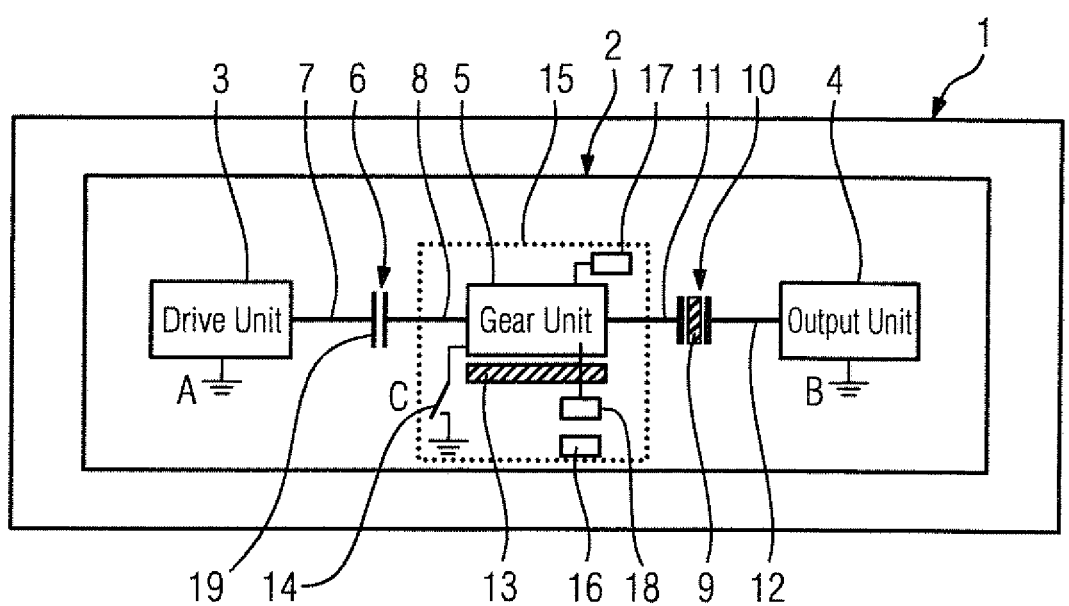

MACHINE WITH A DRIVE TRAIN

CROSS-REFERENCES TO RELATED APPLICATIONS

This application claims the priority of European Patent Application, Serial No. EP 14156112, filed on Feb. 21, 2014, pursuant to 35 U.S.C. 119(a)-(d), the disclosure of which is incorporated herein by reference in its entirety as if fully set forth herein.

BACKGROUND OF THE INVENTION

The present invention relates to a machine with a drive train.

The following discussion of related art is provided to assist the reader in understanding the advantages of the invention, and is not to be construed as an admission that this related art is prior art to this invention.

Drive trains for machines typically include a drive unit, an output unit and a gear unit which interconnects the drive unit and the output unit. The tribologically stressed components of the gear unit, especially in the form of gearings and roller bearings, are subject to high levels of stress during operation of the machine, resulting in different types of damage. Such damage can be countered firstly by a corresponding design of the gear unit components, based around an appropriate selection of the dimensions, geometry and material of the components and the structural properties, to mention just a few examples. Secondly the composition of the lubricant can be varied. Thus for example aging can be retarded by the addition of additives, which counters premature wear and tear of tribologically stressed surfaces. Individual gear unit components may be insulated electrically, for example the bearings, in order to prevent arcing between the components when there are large differences in potential. Such arcing could cause damage.

It would be desirable and advantageous to provide an improved machine and improved method of operating a machine to obviate prior art shortcomings and to effectively minimize wear and tear and damage to tribologically stressed components of a gear unit in a simple and inexpensive way so as to extend a service life of the gear unit.

SUMMARY OF THE INVENTION

According to one aspect of the present invention, a machine includes a drive train having a drive unit, an output unit, and a gear unit interconnecting the drive unit and the output unit and configured to be in a non-grounded state with respect to the machine environment during a normal operation of the machine, and an insulation configured to electrically insulate a connection between the gear unit and the drive unit and/or a connection between the gear unit and the output unit.

The present invention resolves prior art problems by providing a machine in which the gear unit eliminates the need to short-circuit a voltage in order to protect people. Very high-resistance electrical connections between the gear unit and the environment are thus not regarded as grounding. The inventors have recognized that the diffusion of hydrogen into tribologically stressed surfaces, which is induced by electrical potential differences between surfaces and the associated flow of current, has a significant impact on the development of damage. The absence of grounding of the gear unit has the advantage that all gear unit components are always at a uniform, automatically generated potential, thereby preventing in a simple and inexpensive manner a flow of current between the gear unit components that causes diffusion of hydrogen and associated damage.

According to another advantageous feature of the present invention, a peripheral device can be connected to the gear unit and is electrically insulated with respect to the machine environment during the normal operation of the machine. Examples of a peripheral device includes an oil system, sensors, heating cartridges, etc.

According to another advantageous feature of the present invention, the gear unit can have a safety facility which is configured to automatically ground the gear unit in an event of danger. Such an event of danger involves, for example, a situation in which the presence of a person within a predetermined protection area is detected. As soon as the gear unit is grounded, there is no longer any danger for the person, when contacting the gear unit. The presence of a person can be detected, for example, by light barriers, using switches which are integrated into access doors, etc.

According to another advantageous feature of the present invention, the gear unit can have electrically insulated bearings. In this way circulating currents can be eliminated, in particular in the event that the machine continues to be operated after the emergency grounding of the gear unit.

According to another advantageous feature of the present invention, the gear unit can have an active potential compensation facility to actively control a potential of the gear unit, in particular in the event that the machine continues to be operated after an emergency grounding of the gear unit. An example of an active potential compensation facility is described in DE 10 2010 002 494 A1 to which reference is made herewith.

According to another aspect of the present invention, a method for operating a machine with a drive train includes maintaining a gear unit of the drive train of the machine in a non-grounded state during a normal operation of the machine.

According to another advantageous feature of the present invention, the gear unit can be transferred from the non-grounded state to a grounded state in an event of danger.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic illustration of a machine with a drive train in accordance with the present invention;

DETAILED DESCRIPTION OF PREFERRED EMBODIMENTS

It should be understood that the FIGURE is not necessarily to scale and that embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic illustration of a machine, generally designated by reference numeral 1 and including a drive train, generally designated by reference numeral 2. The drive train 2 includes a drive unit 3, for example in the form of a motor, etc., an output unit 4 and a gear unit 5 interconnecting the drive unit 3 and the output unit 4. The connection between the drive unit 3 and the gear unit 5 is in this case a flange connection 6 which connects an outgoing shaft 7 of the drive unit 3 to an ingoing shaft 8 of the gear unit 5, other connections also being conceivable of course. Thus the outgoing shaft 7 and the ingoing shaft 8 can also be designed as a single part for example. The flange connection is provided with an electrical insulation 19 so as to insulate a connection between the gear unit 5 and the drive unit 3.

The connection between the gear unit 5 and the output unit 4 is defined by a flange connection 10 which is provided with an electrical insulation 9 and connects an outgoing shaft 11 of the gear unit 5 to an ingoing shaft 12 of the output unit 4. The drive unit 3 and the output unit 4 are grounded at points A and B and are thus in electrical connection with the machine environment, for example with a subfloor on which they are mounted. The gear unit 5 is in contrast insulated with respect to the machine environment by an electrical insulation 13. At point C, the gear unit 5 is grounded, it being possible to selectively deactivate the grounding by throwing a switch 14. In this case the non-grounded state of the gear unit 5 depicted in the drawing represents the state which pertains during normal operation of the machine 1. At least the gear unit 5 is arranged in a protection area 15, which in this case is represented by a dotted line and serves to prevent any inadvertent contact between a person and the gear unit 5 in the non-grounded state. The protection area 15 is provided with a safety facility 16 which is designed such that it automatically throws the switch 14 as soon as a person enters the protection area 15, so that the gear unit 5 is transferred from the non-grounded state to the grounded state. Entry into the protection area 15 can for example be detected by a suitable detection facility which detects the presence of the person in the entry area of the protection area 15, for example a light barrier, a sensor, a switch which is activated when the access is opened, etc. The gear unit 5 has a further peripheral device 17 which is designed such that it is electrically insulated in respect of the machine environment during normal operation of the machine 1. The peripheral device 17 can for example be an oil system, sensors, heating cartridges, etc. Since such a peripheral device 17 is sufficiently known in the prior art, it will not be discussed further here. In addition the gear unit 5 is provided with an active potential compensation facility 18 which is designed such that it is used to actively control the potential of the gear unit 5, in other words the voltage present at the gear unit 5 can be increased or decreased. The potential compensation facility 18 can for example be one such as that disclosed in DE 10 2010 002 494 A1. Even though it is not shown in the drawing, the bearings of the gear unit are electrically insulated in respect of the adjacently arranged gear unit components.

During normal operation of the machine 1 the gear unit 5, as depicted in the drawing, is not grounded, when the switch 14 is open. Furthermore, the gear unit 5 is electrically insulated by the electrical insulation 9 in respect of the output unit 4, and also by the electrical insulation 13 in respect of the machine environment. The gear unit 5 is thus only connected to the grounded drive unit 3, so that the electrical potential of the gear unit 5 automatically adjusts itself to the electrical potential of the drive unit 3 and vice versa. The components of the gear unit 5 in this case always have a uniform electrical potential, which is why no current flows between them. Accordingly a diffusion of hydrogen which would cause damage is reliably prevented.

In view of the fact that the gear unit 5 is not grounded when the switch 14 is open and thus represents a considerable source of danger, the protection area 15 is provided, in order to shield the gear unit 5 and correspondingly prevent people from coming into contact with the gear unit 5 during normal operation of the machine 1. As soon as a person enters the protection area 15, his presence is detected by the safety facility 16, whereupon the switch 14 is automatically thrown and the gear unit 5 is grounded. In this state the person can touch the gear unit 5 without any danger.

As soon as the gear unit 5 undergoes emergency grounding in the manner described above, potential differences occur between the gear unit components, which is why a diffusion of hydrogen can take place. To counter the diffusion of hydrogen in this emergency-grounded state, the active potential compensation facility 18 is provided, which at least reduces the potential differences present. The electrical insulation of the bearings of the gear unit 5 prevent circulating currents arising in the grounded state of the gear unit.

Thanks to the inventive structure of the drive train 2 of the machine 1, damage to tribologically stressed gear unit components which is caused by diffusion of hydrogen is effectively, simply and inexpensively countered.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and incudes equivalents of the elements recited therein:

1. A machine, comprising:
   a drive train having a drive unit, an output unit, and a gear unit between the drive unit and the output unit and configured to be in a non-grounded state with respect to the machine environment during a normal operation of the machine; and
   an insulation configured to electrically insulate a connection between the gear unit and the drive unit and a connection between the gear unit and the output unit, wherein the gear unit has a safety facility configured to automatically ground the gear unit in an event of danger.

2. The machine of claim 1, further comprising a peripheral device connected to the gear unit and electrically insulated with respect to the machine environment during the normal operation of the machine.

3. The machine of claim 1, wherein the gear unit has electrically insulated bearings.

4. The machine of claim 1, wherein the gear unit has an active potential compensation facility to actively control a potential of the gear unit.

5. A method for operating a machine with a drive train having a drive unit, an output unit, and a gear unit between the drive unit and output unit, comprising maintaining a gear unit of the drive train of the machine in a non-grounded state during a normal operation of the machine, electrically insulating a connection between the gear unit and the drive unit and a connection between the gear unit and the output unit, and maintaining the gear unit automatically grounded in an event of a danger.

\* \* \* \* \*